United States Patent [19]

Preston et al.

[11] Patent Number: 5,312,859
[45] Date of Patent: May 17, 1994

[54] ACID ACCEPTOR FOR POLYMERS CONTAINING ACID MOIETIES

[75] Inventors: Barry W. Preston, Whiteford; Robin F. Lewis, Bel Air, both of Md.; Gerard Mooney, Ajax, Canada; Suneet K. Sikka, Churchville; Claude R. Andrews, Pasadena, both of Md.

[73] Assignee: J. M. Huber Corporation, Rumson, N.J.

[21] Appl. No.: 843,777

[22] Filed: Feb. 19, 1992

[51] Int. Cl.⁵ .............................. C08K 3/10; C08K 3/22
[52] U.S. Cl. ................................... 524/436; 524/437
[58] Field of Search ............................. 524/436, 437

[56] References Cited

U.S. PATENT DOCUMENTS

| | | | |
|---|---|---|---|
| 3,784,392 | 1/1974 | Bertorelli | 106/468 |
| 3,912,671 | 10/1975 | Kondo et al. | 524/436 |
| 3,931,095 | 1/1976 | Kondo et al. | 524/437 |
| 4,085,088 | 4/1978 | Miyata et al. | 260/45.7 |
| 4,154,718 | 5/1979 | Miyata et al. | 260/45.7 |
| 4,299,759 | 5/1980 | Miyata et al. | 260/45.7 |
| 4,340,493 | 7/1982 | Miyata | 252/18 |
| 4,347,353 | 8/1982 | Miyata et al. | 528/485 |
| 4,351,814 | 9/1982 | Miyata et al. | 423/306 |
| 4,379,882 | 4/1983 | Miyata | 524/436 |
| 4,427,816 | 1/1984 | Aoki et al. | 524/357 |
| 4,529,769 | 7/1985 | Johnson et al. | 524/425 |
| 4,547,620 | 10/1985 | Miyata et al. | 585/852 |
| 4,558,102 | 12/1985 | Miyata | 525/348 |
| 4,585,700 | 4/1986 | Johnson et al. | 428/419 |
| 4,611,024 | 9/1986 | Wolfe | 524/366 |
| 4,686,791 | 8/1987 | Miyata et al. | 524/437 |
| 4,729,854 | 3/1988 | Miyata et al. | 524/436 |

FOREIGN PATENT DOCUMENTS

| | | | |
|---|---|---|---|
| 3327348 | 2/1985 | Fed. Rep. of Germany . | |
| 0005421 | 3/1967 | Japan | 524/436 |
| 49-108149 | 10/1974 | Japan . | |
| 7452671 | 7/1978 | Japan . | |
| 57-118020 | 7/1982 | Japan . | |
| 58-101183 | 6/1983 | Japan . | |
| 58-174482 | 9/1983 | Japan . | |
| 0071310 | 4/1984 | Japan | 524/437 |
| 59-157168 | 9/1984 | Japan . | |
| 59-157169 | 9/1984 | Japan . | |
| 59-157195 | 9/1984 | Japan . | |
| 0167355 | 7/1987 | Japan | 524/436 |
| 62-241892 | 10/1987 | Japan . | |
| 0295955 | 12/1987 | Japan | 524/436 |
| 0039939 | 2/1988 | Japan | 524/436 |
| 3-187917 | 8/1991 | Japan . | |
| 590281 | 2/1978 | U.S.S.R. . | |

*Primary Examiner*—Paul R. Michl
*Assistant Examiner*—Peter Szekely
*Attorney, Agent, or Firm*—Harold H. Flanders; Robert L. Price

[57] ABSTRACT

A method for stabilizing or inactivating a detrimental and moiety in curable, cross-linkable, and thermoplastic polymers which comprises mixing 100 parts by weight of acid moiety containing polymer with from about 0.1 to about 40 parts by weight of tricalcium aluminum hexahydrate and the resulting composition are disclosed.

8 Claims, No Drawings

ACID ACCEPTOR FOR POLYMERS CONTAINING ACID MOIETIES

TECHNICAL FIELD

The present invention relates to a synthetic calcium aluminum hydroxide, its method of preparation and its use as an acid acceptor in polymers. In particular, the present invention relates to tricalcium aluminum hexahydrate which is used as an acid acceptor in halogenated polyolefins, recycled or post-consumer plastics, polyarylene sulfides and other polymeric systems containing acid moieties.

BACKGROUND

Many polymeric systems are known to contain trace amounts of acidic moieties which over time or processing produce undesirable side effects, e.g., color instability, odor, physical degradation, irregular cure patterns or corrosion of processing equipment. In order to overcome these limitations in polymeric systems, a type of additive, generally referred to as an acid acceptor or acid scavenger, is incorporated therein to preferentially react with these acid moieties to prevent or delay these undesired side effects.

It is known that thermoplastic polymers, which embrace both homopolymers and copolymers blend/alloys and elastomers, containing halogens derived from polymerization catalysts and/or attributed to the after-halogenation of the polymers, such as olefin polymers or copolymers produced by using Ziegler-type catalysts comprising a halogen-containing compound as a catalyst component and/or a carrier component, or the after halogenated products of these polymers, frequently corrode processing or compounding machines during their molding operation, or discolor or degrade the resulting molded articles, because of the halogens contained therein.

Compositions of poly(arylene sulfide) also often suffer from mold corrosion difficulties. It would be desirable to produce a poly (arylene sulfide) molded composition which exhibited low mold corrosiveness, improved insulating properties and retention of strength in moist environments.

It also has been found that when post-consumer thermoplastic polyolefin articles are subject to the recompounding and recycling process, offensive odors from absorbed contaminants (e.g. milk, halogens) inpart an offensive odor. Further, many post-consumer polyolefins suffer from unacceptable cross-linking during reprocessing as a result of these contaminants. Acid acceptors may also be used in post-consumer thermoplastics such as polyethylene, polypropylene, polyethylene terephthalate (PET), PBT, polyphenyl sulfide, and polyvinyl chloride, which contain undesirable organic acids from impurities, acidic moieties released during extensive processing or halogen containing polymer contaminants. Accordingly, acid acceptors may be employed to counter or ameliorate these difficulties.

An acceptable acid acceptor should preferentially react with the undesired acid moiety but should not have detrimental effects on the physical or mechanical properties of the polymers in which it is placed. Typical acid acceptors used in polymeric systems include hydrotalcite, lead oxide, calcium sterate, etc. Cross-linking polymer systems which typically employ acid acceptors include halogenated polyolefins, such as polyvinyl chloride, chlorofluoropolymers, and polyarylene sulfide which for purposes of this patent is considered a polyolefin.

The present invention provides for synthetic acid acceptor pigments which are particularly suitable for use in thermoplastic polymers containing trace amounts of detrimental acidic moieties or in curable thermoplastic polymers which utilize acid acceptors.

SUMMARY OF INVENTION

This invention pertains to a polymer composition comprising substantially 100 parts by weight of thermoplastic polymer which contains an acid moiety and about 0.1 to about 40 parts by weight tricalcium aluminum hexahydrate.

The invention also pertains to a method for stabilizing or inactivating a detrimental acid moiety in a cross-linkable polymer which comprises mixing 100 parts by weight of acid moiety containing polymer with about 0.1 to about 40 parts by weight tricalcium aluminum hexahydrate.

It is an object of the present invention to provide for synthetic tricalcium aluminum hexahydrate for use as an acid acceptor in halogenated polyolefins.

It is another object of the present invention to provide for acid acceptor pigments which do not have detrimental effects on physical or mechanical properties of the polymer.

It is another object of the present invention to provide for acid acceptor pigments which are more efficient acid acceptors.

It is another object of the present invention to provide an alternative acid acceptor pigment to hydrotalcite in selected applications.

It is yet another object of the present invention to provide for a polymeric composition which includes an effective amount of an improved acid accepting additive.

DETAILED DESCRIPTION

The present invention involves the use of synthetic tricalcium aluminum hexahydrate pigment which is characterized by a substantially uniform platelet morphology. In particular, the invention relates to this synthetic pigment as an acid acceptor in various cross-linkable polymers containing detrimental or undesired acid moieties. The pigment participates to avoid acidic cross-linking in thermoplastic polyolefins but aids in acid initiated cross-linking in curable polymers where acid acceptors are used.

The preferred method for preparing the synthetic tricalcium aluminum hexahydrate involves a precipitation reaction wherein calcium hydroxide and aluminum trihydrate are reacted under aqueous conditions at moderate temperatures (e.g. between 70° and 100° C.) with agitation. The pigment so produced is tricalcium aluminum hexahydrate having the following formula:

$$3CaO \cdot Al_2O_3 \cdot 6H_2O$$

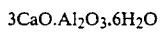

These reactants are reacted in stochiometric amounts according to the following equation.

$$3Ca(OH)_2 + 2Al(OH)_3 + H_2O \rightarrow 3CaO \cdot Al_2O_3 \cdot 6H_2O$$

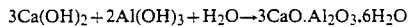

For additional discussion of the production of tricalcium aluminum hexahydrate, see U.S. Pat. No. 3,931,095 to Kondo et al. herein incorporated by reference.

The following example is presented to illustrate one method of preparing tricalcium aluminum hexahydrate. In these examples, and throughout, percentages are by weight unless otherwise indicated.

EXAMPLE 1

A total of 246 grams of $CaOH_2$ in slurry (18.3% solids) was added to a beaker. To this was added 250 grams of water. After agitating five minutes, 60 grams of sodium aluminate (molar ratio of $Na_2O/Al_2O_3 = 1.25$) diluted with 200 grams of water was slowly added to the calcium hydroxide. The reactants were heated to 95° C. and maintained for three hours. The product was isolated by filtration, dried and coffee milled. The product was identified as tricalcium aluminum hexahydrate by XRD analysis.

EXAMPLE 2

A total of 202 grams of calcium hydroxide in slurry (18.3% solids) was added to a beaker. To this was added 450 grams of water and 39 grams of 1 micron grind $Al(OH)_3$. The reactants were heated to 95° C. and maintained for three hours. The product was isolated by filtration, dried, and milled as above.

EXAMPLE 3

A total of 616 grams of $Ca(OH)_3$ in slurry as above was added to 600 grams of water in a Parr reactor. To this was added 78 grams of 1 micron $Al(OH)_3$. The reactor was heated to 175° C. and maintained for two hours. The product was isolated by filtration, dried and coffee milled. This product was identified as tricalcium aluminum hexahydrate by XRD analysis. This material has a platelet morphology and is quite uniform. The platelets are about 0.75 microns in diameter.

The above described synthetic pigments can be dried at room temperature or at elevated temperatures up to 260° C. without effecting the particle morphology of the material. This high degradation temperature stability of the particle morphology of the hydrated pigment permits the incorporation of the pigment into a variety of polymer systems which are processed below about 260° C. Although not presently preferred, the tricalcium aluminum hexahydrates used in the present invention may be surface treated with a fatty acid or its salt. This treatment would be used if it becomes desirable to increase dispersibility. Preferably the surface treatment is carried out by using about one to ten parts by weight of a salt of a fatty acid per 100 parts by weight of the tricalcium aluminum hexahydrate. A further discussion of both surface treatments and polyolefins which may benefit from the acid acceptor of the present invention, may be found in U.S. Pat. No. 4,379,882 to Miyata, which is hereby incorporated by reference.

The compositions of this invention contain 100 parts of the acid moiety containing thermoplastic polymer and about 0.01 to about 40 parts by weight of the tricalcium aluminum hexahydrate described herein. If a nucleating agent or catalyst deactivator is desired, the amount of additive used is preferably 0.01–0.1 phr, more preferably 0.03–0.05 phr. If acid scavenging is desired for purposes such as odor control or corrosion prevention, the amount of additive used is preferably 0.01 to about 10 phr, more preferably about 1 to 5 phr. If the additive is to participate as an acid acceptor or crosslinking curing agent, preferably 5–40 parts by weight is used.

The compositions of this inventions can be prepared by blending the aforesaid acid acceptor with a thermoplastic polymer, copolymer, alloy, or elastomer, including polyarylene sulfides, polyolefin terephthalates, etc., using any means of blending which insures uniform mixing, for example, conventional means for incorporating stabilizers, fillers etc., into resins. This can be achieved, for example, by a means of a ribbon blender, a high speed mixer, a mixer pelletizer, a mixing roll, an extruder or an intensive mixer. These acid acceptors may be incorporated as powders or concentrates at the same time as other conventional additives normally used with polyolefins or polyarylene sulfides are incorporated, such as anti-oxidants, ultra violet absorbers, anti-static absorbers, curing agents, and fillers.

The following examples illustrate the present invention more specifically. It is well known that in PVC (polyvinyl chloride) resin, HCl gas is a by-product of degradation. It is a discovery of the present invention that HCl gas can be neutralized/accepted by addition of low levels of tricalcium aluminum hexahydrates to the resin. Effectiveness of an acid acceptor can be determined by measuring the induction time for the evolution of HCl gas and the rate constant for its release by heating the resin at 150°–250° C. A long induction time is indicative of the effectiveness of the acid acceptor in capturing any released HCl gas. A small rate constant is suggestive of a slow release of HCl gas due to acid accepting properties of the additive. A technique for measuring induction time and rate constants has been described by C. R. Andrews and M. E. Tarquini, Proceedings of the International Conference on Fire Safety, Vol. 14, 1989, pp. 237–243, which is hereby incorporated by reference.

COMPARATIVE EXAMPLE 4

A typical PVC pipe formulation was mixed as follows: 2000 grams of PVC resin from Georgia Gulf along with 10 grams (0.5 phr) of PVC stabilizer CC7711 available from Cardinal Chemical were mixed at 1500 rpm at a 140° F. in a Henschel mixer for 15 minutes. Thereafter was added 24 grams (1.2 phr) of S wax 3, 12 grams (0.6 phr) of Z wax was both available from Cordewick Chemical, 3 grams (0.15 phr) oxidized polyethylene AC629A available from Allied-Signal of Morristown, N.J. Mixing was continued at 1500 rpm at 200° F. in the Henschel mixer for 15 minutes. Thereafter was added 100 grams (5 phr) of Q3T calcium carbonate, available from J. M. Huber Corporation of Quincy, Ill., and 20 grams (1 phr) of $TiO_2$ R101 available from E I Dupont de Nemours of Wilmington, Del. The mixing was continued at 1500 rpm at 230° F. in the Henschel mixer for an additional 10 minutes and cooled to room temperature. The formulation were melted in a Brabender plasticorder mixing bowl and pressed into sheets by compression molding in a hydraulic press heated at 200° C. The induction times and rate constants were measured.

EXAMPLE 5

The calcium carbonate of Example 4 was completely replaced with 5 phr tricalcium aluminum hexahydrate.

COMPARATIVE EXAMPLE 6

The calcium carbonate of Example 4 was partially (2.5 phr) replaced with hydrotalcite.

COMPARATIVE EXAMPLE 7

The calcium carbonate of Example 4 was fully replaced with hydratalcite. The data is summarized as follows:

| Formulation | Induction Time | Rate Constant$^{min-1}$ |
| --- | --- | --- |
| Comp. Example 4 | 6.67 | $25.7 \times 10^{-3}$ |
| Example 5 | 9.08 | $9.7 \times 10^{-3}$ |
| Comp. Example 6 | 7.02 | $25.8 \times 10^{-3}$ |
| Comp. Example 7 | 6.98 | $35.3 \times 10^{-3}$ |

In the above examples, it is apparent that tricalcium aluminum hexahydrate is more efficient as an acid acceptor because of the longer induction time and lower rate constant. It is apparent that based upon the induction time and rate constants of the above examples, tricalcium aluminum hydroxide is a more efficient acid acceptor than hydrotalcite.

In another embodiment of the composition of the present invention, a molding composition will contain an intimate mixture of a 100 parts by weight of polyarylene sulfide resin and about 0.1 to about 20 parts by weight of the tricalcium aluminum hexahydrate. For a further discussion of polyarylene sulfide resins and methods of incorporating an acid acceptor therein, see U.S. Pat. Nos. 4,529,769 and 4,585,700 to Johnson et al., which are hereby incorporated by reference.

EXAMPLE 8

In a PVC pipe formulation described in Example 4, the conventional stabilizer, CC7711 was replaced with tricalcium aluminum hexahydrate plus other additives. The formulations were mixed and processed in a Brabender plasticorder mixing bowl at 180° C. at 100 rpm. Torque vs. time were recorded by the Brabender plasticorder. Color of the molten formulation was observed after 15 minutes of mixing. If the PVC degrades during processing, the color of the formulation changes from white to yellow to beige, to brown and finally black. This PVC formulation was chosen as a typical polymer system for evaluation of stabilizer. The tricalcium aluminum hexahydrate and other additional additives are set forth in the following table.

| Additive | Level phr | Other Additives Synergists | Level phr | Results |
| --- | --- | --- | --- | --- |
| TAH | 2 | Pentaerythritol Tetrastearate | 1 | Dark Beige color PVC degraded |
| TAH | 2 | Bisphenol A | 2 | Beige Color |
| TAH | 1 | Dibenzoylmethane Triphenylphosphite | 1} 1} | Yellowish color |
| TAH | 3 | Dibenzoylmethane Triphenylphosphite | 2} 1} | White Color |
| TAH | 3 | Dibenzoylmethane b-aminophenol | 2} 1} | White Color |

The results show that TAH in combination with dibenzoylmethane and Triphenyl phosphite can replace Ba, Cd type metal soap stabilizers in PVC's. The results of the above table suggest that tricalcium aluminum hexahydrate in combination with conventional stabilizers can enhance stabilizer performance and perhaps reduce or eliminate the need for heavy metal stabilizers.

We claim:

1. A polymer composition comprising substantially 100 parts by weight of a thermoplastic polymer, containing an acid moiety and about 0.01 to about 40 phr tricalcium aluminum hexahydrate as an acid acceptor.

2. The composition of claim 1 wherein the thermoplastic polymer is one or more members selected from the group consisting of halogenated polyolefins, polyarylene sulfides, and polyolefin terephthalates.

3. A method of inactivating a detrimental acid moiety in a thermoplastic polymer, which method comprises mixing 100 parts by weight of an acid moiety-containing thermoplastic polymer with about 0.01 to about 40 parts by weight of tricalcium aluminum hexahydrate.

4. The polymer composition of claim 1 wherein the acid moiety is a halogen derived from a polymerization catalyst or attributed to after-halogenation of the polymer.

5. A polymer composition of claim 1 wherein the acid moiety is an acidic degradation product released over time from a halogenated thermoplastic.

6. The polymer composition of claim 1 wherein the acid moiety is an acidic contaminate found in reprocessed or post consumer polymers.

7. The polymer composition of claim 1 wherein the acidic moiety is a cross-linking initiator found in reground, reprocessed or post consumer polymers.

8. The polymeric composition of claim 1 wherein the tricalcium aluminum hexahydrate acid acceptor is surface treated with about 1 to 10 parts by weight per 100 parts by weight of the acid acceptor, of a fatty acid or its salt.

* * * * *